(12) United States Patent
Perni et al.

(10) Patent No.: US 6,851,648 B2
(45) Date of Patent: Feb. 8, 2005

(54) BALL SCREW ACTUATOR FOR AIRCRAFT CONTROL SURFACES

(75) Inventors: Federico Perni, Trevi (IT); Sandro Capolungo, Torgiano (IT); Luciano Pizzoni, Foligno (IT)

(73) Assignee: Umbra Cuscinetti S.p.A., Foligno (IT)

( * ) Notice: Subject to any disclaimer, the term of this patent is extended or adjusted under 35 U.S.C. 154(b) by 11 days.

(21) Appl. No.: 10/642,603

(22) Filed: Aug. 19, 2003

(65) Prior Publication Data
US 2004/0200929 A1 Oct. 14, 2004

(30) Foreign Application Priority Data
Apr. 11, 2003 (IT) .................................... RM2003A0169

(51) Int. Cl.$^7$ .............................................. B64C 15/00
(52) U.S. Cl. ................................................... 244/75 R
(58) Field of Search .............................. 244/75 R, 213, 244/214, 215; 74/424.81–424.93

(56) References Cited

U.S. PATENT DOCUMENTS

| 2,447,439 | A | * | 8/1948 | Thompson | 74/89.39 |
|---|---|---|---|---|---|
| 3,467,363 | A | * | 9/1969 | Reichel | 366/116 |
| 3,630,328 | A | * | 12/1971 | Nelson | 192/223 |
| 5,178,030 | A | * | 1/1993 | Bousquet | 74/424.9 |
| 5,467,661 | A | * | 11/1995 | Lange | 74/441 |
| 6,672,540 | B1 | * | 1/2004 | Shaheen et al. | 244/75 R |
| 6,685,382 | B2 | * | 2/2004 | Capewell et al. | 403/343 |
| 2003/0029258 | A1 | * | 2/2003 | Davies et al. | 74/89.26 |

* cited by examiner

*Primary Examiner*—Galen Barefoot
(74) *Attorney, Agent, or Firm*—Young & Thompson

(57) ABSTRACT

A ball screw actuator for aircraft control surfaces includes a lead screw, a motor to set the screw in rotation about its longitudinal axis and a primary body connected to a control surface and engaged on the control screw via a plurality of balls movable on the thread of the screw. A secondary body is connected to the primary body and has an auxiliary portion provided with an engagement surface facing the thread of the lead screw at a predetermined distance; the engagement surface is shaped to engage on the thread of the lead screw. The actuator also includes a device for uncoupling the secondary body from the auxiliary portion in the rotation motion about the longitudinal axis.

21 Claims, 2 Drawing Sheets

BALL SCREW ACTUATOR FOR AIRCRAFT CONTROL SURFACES

BACKGROUND OF THE INVENTION

The present invention relates to a ball screw actuator for aircraft control surfaces. Aircraft control surfaces are commanded by appropriate actuators able to move them between two extreme positions, in such a way as to make the surfaces assume operative configurations suitable for specific phases of flight. For example, actuators are used to command the flaps installed on the trailing edge of a wing or to control the elevators mounted on the tail empennage.

Ball screw actuators are known which are constituted by a lead screw set in rotation about its own longitudinal axis by a motor and associated to a tubular body, known in the specific art as lead nut, mounted coaxially on the screw itself. The lead nut is cinematically connected to the control surface whilst the screw is mounted integrally on the load bearing structure of the aircraft. The lead nut, which is prevented from rotating, has on its own inner surface appropriate seats for a plurality of balls able to rotate on themselves and to slide in the throat of the thread of the lead nut. The rotation of the lead screw determines, by means of the coupling provided by the screws, the sliding of the lead nut along the longitudinal axis of the screw and the consequent motion of the control surface.

Also known are actuators in which the screw is connected to the control surface and translates, whilst the lead nut is connected to the structure and rotates. Since in the aeronautical field it is necessary to guarantee a very high safety margin to the structures, or put the aircraft at risk of crashing, prior art actuators are provided with particular devices to prevent control surfaces from becoming uncontrollable due to a failure in the lead nut or lead screw.

The loss of the balls of the lead nut or the rupture thereof leads to the loss of the structural continuity between the controls and the controlling surfaces, since the lead nut is free to slide relative to the screw. In this situation, the surfaces are free to move under the action of aerodynamic and inertial forces and the aircraft is absolutely uncontrollable.

To overcome this drawback, known actuators have been built which comprise an auxiliary lead nut, connected to the main one, which becomes operative when a malfunction occurs in the main lead nut itself. The auxiliary lead nut serves as a safety device.

For instance, auxiliary ball lead nuts are known which are structurally similar to the primary ones. Although this type of solution assures control even after the rupture of the main lead nut, it should be noted that auxiliary lead nuts can be subject to the same type of failure as the primary ones.

Also known are inverse thread auxiliary lead nuts constituted by a tubular portion connected to the main lead nut which has on its own inner surface, facing the lead nut, a thread with reversed shape relative to the thread of the screw.

During the proper operation of the main lead nut, the balls maintain the reversed thread of the auxiliary lead nut at a determined distance from the thread of the screw and the tubular portion of the is perfectly coaxial to the longitudinal axis of the screw.

As a result of the loss of the balls caused by a failure, both lead nuts lose the coaxial positioning relative to the shaft of the screw and the inverse thread of the auxiliary lead nut is engaged in the throat of the thread of the lead nut.

A first type of inverse thread auxiliary lead nut is made of low friction material which slides in the throat of the thread of the screw and serves the function of the balls for a certain fraction of the required working life. The main drawback of such a solution is that the duration of the low friction inverse thread cannot be estimated correctly; the thread can be damaged rapidly and lead to the lack of structural connection between the aforementioned components.

Auxiliary lead nuts are known with high friction coefficient which causes the seizure of the auxiliary lead nut on the screw and the consequent locking of the main lead nut and of the control surfaces connected thereto. The control surfaces are no longer controllable, but remain motionless in a determined position, allowing in any case to control the aircraft to a landing.

The seizure of the inverse thread on the screw occurs during the rotation thereof. The torque imparted to the screw by the motor is contrasted by the friction torque imparted by the inverse thread under the action of the external load. Consequently, the load at which the seizure occurs may be very high and not included in the flight envelope of the aircraft.

Also known from the document U.S. Pat. No. 6,467,363 is a device for blocking a ball screw actuator, which comprises a sensor mechanism, able to detect a malfunction of the primary lead nut, and means for blocking the screw relative to the primary lead nut in case of failure. The locking means are defined by a pair of disk-shaped elements which, activated by the sensor mechanism, are thrust by respective springs between the throat of the thread of the screw and an inner surface of a containment body of the screw itself. This device is formed by a multiplicity of elements easily subject to rupture which cannot assure the necessary safety margin.

Lastly, the document U.S. Pat. No. 4,644,811 has a ball screw actuator provided with a free wheel end stop device. The actuator comprises a ball screw threaded on a predominant portion except at one of its ends. The screw is inserted in a main lead nut, provided with balls engaged on the thread of the screw, and in a secondary lead nut, integral with the main one and driven thereby. The secondary lead nut is coupled with the main one by means of a retaining pin and a thrust bearing interposed axially.

When the main lead nut exits the threaded portion of the screw and tends to continue its own run, the secondary lead nut is engaged on the thread of screw and tends to rotate with the screw itself breaking the retaining pin. This device allows the lock the lead nut only at the end of the run.

SUMMARY OF THE INVENTION

An aim of the present invention is to solve the problems noted in the prior art, proposing a ball screw actuator for aircraft control surfaces able to overcome the aforementioned drawbacks. In particular, an aim of the present invention is to provide a ball screw actuator for aircraft control surfaces that assures the ability of controlling the aircraft even in case of failure of the main lead nut.

Another aim of the present invention is to propose a simple and reliable ball screw actuator for aircraft control surfaces.

A further aim of the present invention is to obtain an actuator provided with a safety device that operates at low loads, to prevent further damages to the devices and allow the nearly complete recovery of the parts that comprise it.

These aims and others besides, which shall become more readily apparent in the course of the present description, are substantially achieved by a ball bearing actuator for aircraft control surfaces comprising the characteristics expressed in one or more of the accompanying claims.

BRIEF DESCRIPTION OF THE DRAWINGS

Further characteristics and advantages shall become more readily apparent from the detailed description of a preferred, but not exclusive, embodiment of a ball bearing actuator for aircraft control surfaces in accordance with the present invention. The description shall be provided below with reference to the accompanying figures, provided purely by way of non limiting indication, in which:

FIG. 3 shows a portion of the actuator of FIG. 2 in a second operative condition (operation in failure condition).

DESCRIPTION OF THE PREFERRED EMBODIMENTS

Figure 1:
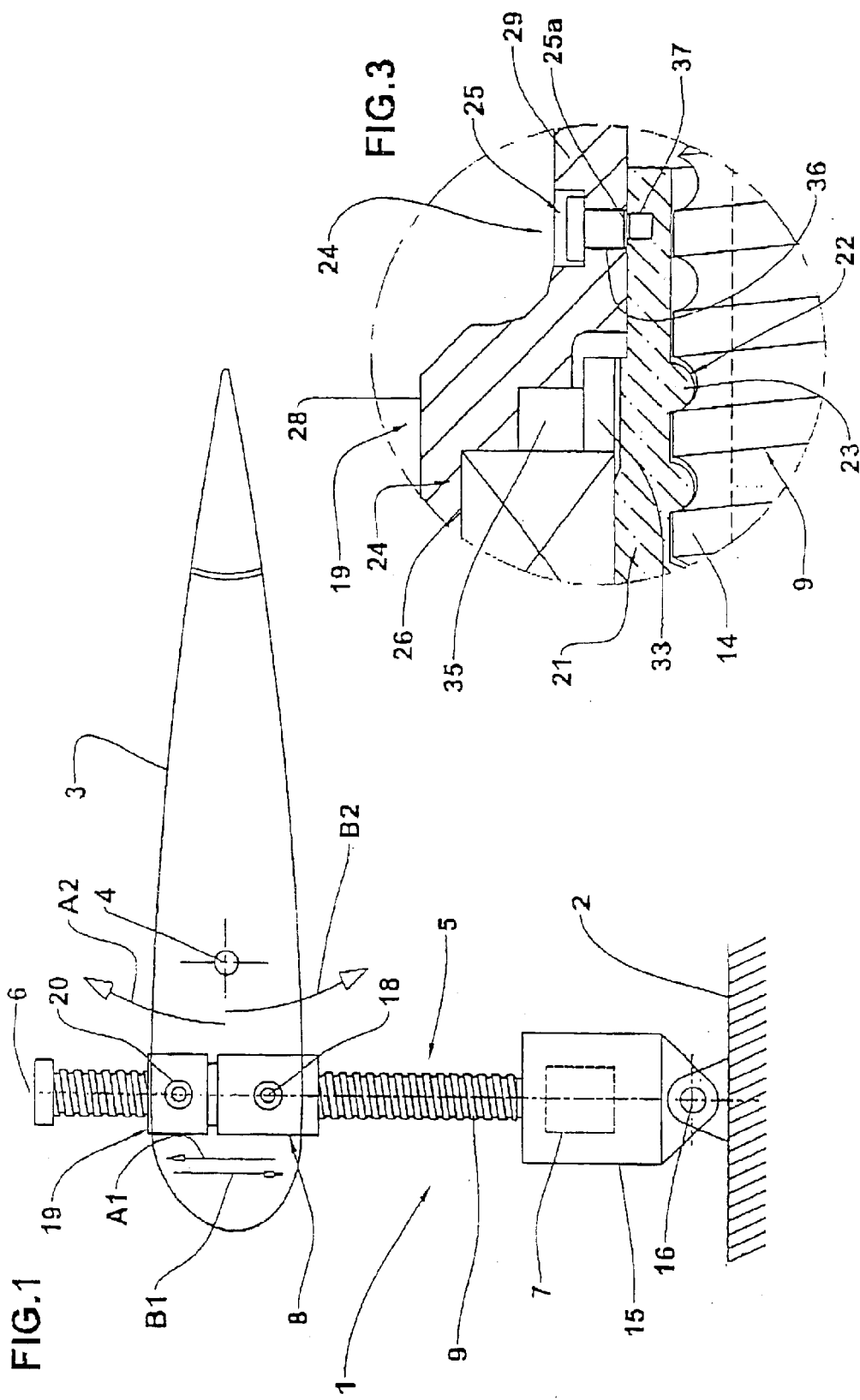
FIG. 1 schematically shows a cross section of a control surface of an aircraft connected to an actuator in accordance with the present invention.

With reference to the accompanying figures, the number 1 globally designates a ball screw actuator for aircraft control surfaces according to the present invention.

In the illustrated embodiment, the actuator 1 is housed within a structure 2 of the aircraft, for instance the tail boom, and commands the movement of a control surface 3, for example the stabilizer of the tail plane. The stabilizer 3 is moved by the actuator 1 about its own hinge axis 4, to change its own angle of attack.

The actuator 1 comprises a lead screw 5 which is moved in rotation about its own longitudinal axis 6 by motor means 7, known and therefore illustrated only schematically in FIG. 1, connected to the to the pilot's controls.

On the lead screw 5 is mounted a primary body 8, which in the specific technical field goes under the name of lead nut, coupled to the thread 9 of the screw 5 by means of a plurality of balls 10.

Figure 2:
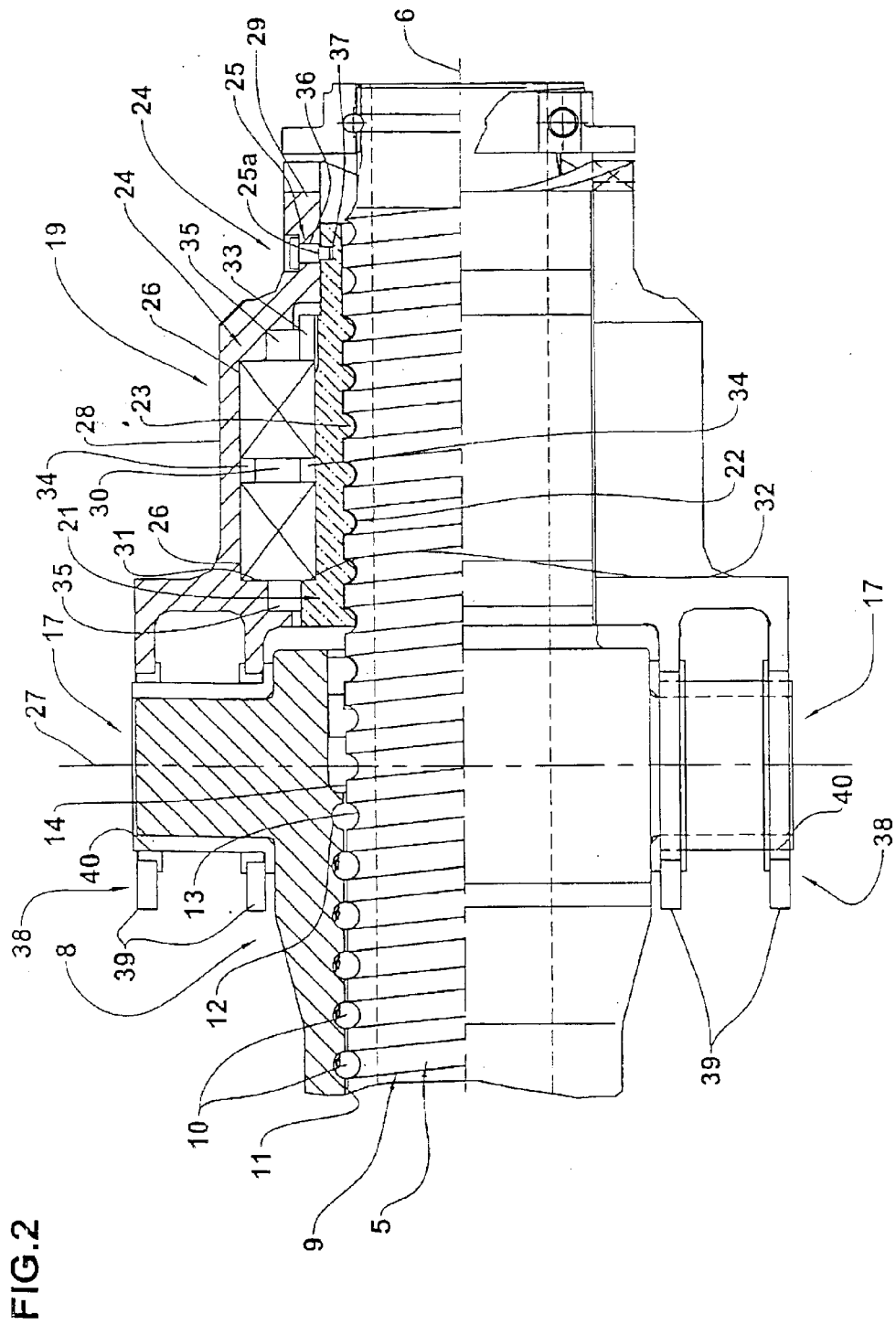
FIG. 2 shows an enlarged, partially sectioned view of the actuator of FIG. 1, in a first operative condition (normal operation)

In particular, as FIG. 2 shows, the primary body 8, tubular shaped, has an inner surface 11 provided with seats 12 for the balls 10. The balls 10 are located in the throat 13 of the thread 9 and constitute the structural connection between the screw 5 and the nut 8. The balls 10 also keep at a certain distance the planar crest 14 of the thread 9 from the inner surface of the primary organ 8.

The rotation of the screw 5 relative to the primary body 8 about the longitudinal axis 6 causes the balls 10 to slide in the throat 13 of the thread 9 of the screw 5 and the primary body 8 to move axially relative to the screw 5.

In the embodiment shown in FIG. 1, the screw 5 is mounted by means of a primary support body 15 on the structure 2 of the aircraft and the primary body 8, connected to the control surface 3, slides along the longitudinal axis 6 of the screw 5. The support body 15 is pivotally engaged to the structure 2 in correspondence with a hinge 16.

In an embodiment not shown herein, the primary body 8 is fastened to the support body 15 whilst the screw 5 slides axially inside the lead nut. The control surface 3 is connected to an end of the screw 5, for instance by means of an eyelet pivotally mounted on said end.

The primary body 8 is connected to the control surface 3 by means of redundant structural elements. With reference to the preferred embodiment shown in FIG. 2, the primary body 8 has two latching portions 17 which extend from opposite sides relative to the longitudinal axis 6 of the screw 5. Each of the latching portions 17 is engaged to the elevator 3.

By way of example, in the embodiment shown in FIG. 1, the primary body 8 is hinged to the control surface 3, in correspondence of its own latching portions 17, about a respective hinge axis 18.

During operation, with reference to FIG. 1, the rotation of the screw 5 in a direction or in the opposite one causes the sliding of the primary body 8 away (arrow A1) from the support 15 or towards (arrow B1) the support body 15. The primary body 8, moving away from the support body 15, causes the clockwise rotation of the stabilizer 3 (arrow A2). The primary body 8, moving towards the support body 15, causes the counter-clockwise rotation of the stabilizer 3 (arrow B2).

The actuator 1 also comprises a secondary body 19 connected to the primary body 8.

The primary body 8 can be directly connected to the secondary body 19, as shown in FIG. 2, or even form a single body with the secondary body 19 itself.

Alternatively, the secondary body 19 is connected directly to the control surface 3 and the primary body 8 is fastened to the secondary body 19 by means of the same control surface 3. In the schematic representation of FIG. 1, the secondary body 19 is connected by means of a hinge 20 to the control surface 3. The hinge 20 is purposely constructed with a determined play so that, during the normal operation of the actuator 1, the lead screw 5 and the primary body 8 are allowed to rotate about their own hinge axis 18.

The secondary body 19 has an auxiliary portion 21, preferably with tubular shape coaxial to the lead screw 5, provided with an engagement surface 22 facing the thread 9 of the screw 5 and at a predetermined distance from the thread 9.

Preferably, the engagement surface 22 is shaped to engage the thread 9. More in detail, the engagement surface 22, which coincides with the inner surface of the auxiliary portion 21 with tubular shape, has an inverse thread 23 shaped counter to the thread 9 of the screw 5 and adapted to engage on the thread 9 of the screw 5 itself (FIGS. 2 and 3).

According to a first embodiment and a first operating mode, which shall be described in detail farther on, the engagement surface 22 of the auxiliary portion 21 is made of material with high friction coefficient.

In a second embodiment, the engagement surface 22 is made of low friction material.

Advantageously, the actuator 1 further comprises means 24 for uncoupling the secondary body 19 from the auxiliary portion 21 in the rotation motion about the longitudinal axis 6; said means are radially interposed between the secondary body 19 and the auxiliary portion 21.

In the preferred embodiment, the uncoupling means 24 have at least a weakened portion 25 which connects the secondary body 19 to the auxiliary portion 21 and, preferably, friction reducing means 26 interposed between the auxiliary portion 21 and the secondary body 19.

Both the weakened portion 25 and the friction reducing means 26 work on the rotation motion between the two aforementioned components.

The removal of the weakened portion 25 allows the relative rotation between the secondary body 19 and the auxiliary portion 21 whilst the friction reducing means 26 facilitate said rotation. The two bodies 19, 21 are instead axially integral.

Preferably, the weakened connecting portion 25 is a pin inserted both in the secondary body 19 and in the auxiliary portion 21 whilst the friction reducing means 26 are defined by at least a bearing, for instance a ball bearing, which, radially interposed between the two bodies 19, 21, bears the loads in the direction of the longitudinal axis 6. More in detail, the primary body 8 is preferably constituted by a tubular portion, which bears the inner surface 11 provided with the seats 12 for the balls 10.

The secondary body 19 coaxially surrounds the auxiliary portion 21 and is connected, in the embodiment shown in FIG. 2, to the primary body 8 about an axis 27 orthogonal to the longitudinal axis 6 of the control screw 5. The friction reducing means 26 have at least a bearing, preferably two bearings set side by side, interposed between the secondary body 19 and the auxiliary portion 21. The pin 25 is preferably inserted between the secondary body 19 and the auxiliary portion 21.

In particular, the secondary body 19 has a first tubular body 28 radially distanced from the auxiliary portion 21 and a second tubular body 29 coaxial and integral to the first 28 and radially approached to the auxiliary portion 21 (FIG. 3).

Between the first tubular body 28 and the auxiliary portion 21 is defined a containment chamber 30 in which are positioned the two bearings 26 inserted in annular recesses 31, 32 obtained respectively in the first tubular body 28 and in the auxiliary portion 21, to prevent the axial motion of one part relative to the other.

A ring nut 33 fastened to the auxiliary portion 21 axially locks the bearings 26 and the auxiliary portion 21. In the illustrated embodiment, the two bearings 26 are separated by spacers 34 and, between the secondary body 19 and the auxiliary portion 21, outside the bearings 26, are mounted two gaskets 35.

The second tubular body 29 and the end of the auxiliary portion 21 approached thereto have respective coaxial holes 36, 37 for the insertion of the pin 25 which therefore is oriented transversely relative to the longitudinal axis 6 of the screw 5. The pin 25 exhibits a reduction of the section of its own stem 25a which, once placed in the holes 36, 37 is positioned in correspondence with the coupling surfaces between the second tubular body 29 and the end of the auxiliary portion 21.

Lastly in the embodiment illustrated in FIG. 2, the secondary body 19 comprises two appendages 38 which extend towards the primary body 8 and engage the two latching portions 17. Each of the appendages 38 is formed by two arms 39 parallel to the longitudinal axis 6 of the screw 5 and provided with respective coaxial holes 40 into which is inserted one of the two latching portions 17. The articulation axis 27 thus coincides with the axis of the latching portion 17.

In another embodiment the secondary body 19 is connected to the control surface in a manner that is wholly independent from the primary body 8.

In operation, in the absence of failures, the primary body 8 moves on the screw 5 as specified above whilst the engagement surface 22 of the auxiliary portion 21 remains distanced from the thread 9 of the screw 5. The auxiliary portion 21 is not subject to any rotation, since the pin 25 makes it integral with the secondary body 19.

When the actuator 1 as a result of a failure loses the balls 10 or the structural continuity between the primary body 8 and the control surface 3, the consequence is that a segment of the inverse thread 23 of the engagement surface 22 couples with the thread 9 of the screw 5 (FIG. 3).

Due to the high friction coefficient between the screw 5 and the inverse thread 23, the screw 5, in its rotation about the longitudinal axis 6, tends to drag with it the auxiliary portion 21 and causes the breakage of the pin 25 in correspondence with the reduction of the section of the stem 25a.

After the breakage of the pint 25, the auxiliary portion 21 is uncoupled, in the rotation motion, from the secondary body 19 but remains integral with the same secondary body 19 along the longitudinal axis 6. The bearings 26 bear the loads along the longitudinal axis 6 of the screw 5 and the transverse loads caused by the loss of the coaxial condition between the screw 5 and the primary body 8 and secondary body 19.

The screw 5 set in rotation by a command from the pilot, drags with it the auxiliary portion 21 which rotates freely. Consequently, the rotation of the screw 5 does not determine the axial motion of the secondary body 19, of the primary body 8, or the motion of the control surface 3. The pilot is unable to move the stabilizer.

Simultaneously, the aerodynamic forces acting on the control surface 3 are not able to move it. The moment generated by the aerodynamic about the hinge 4 of the control surface 3 unloads on the secondary body 19. The component along the longitudinal axis 6 of the force imparted on the secondary body 19 axially thrusts the auxiliary portion 21 but is unable to move it, since, along this direction, it is integral with the screw 5.

The invention achieves important advantages.

First of all, the actuator according to the present invention assures, following a failure, the immediate coupling of the safety device and the locking of the control surfaces.

Moreover, the seizure of the auxiliary portion on the screw and the separation, in the rotation motion, from the secondary body takes place at known loads, substantially determined by the strength of the connecting pin.

Since the pin can be designed with a rather low breaking load, the actuator according to the present invention allows to avoid further damage to the actuator and to recover nearly all of the parts that compose it during repair operations.

Lastly, the actuator according to the present invention is structurally simple and reliable.

What is claimed is:

1. Ball screw actuator for aircraft control surfaces, comprising:
   a lead screw having a thread;
   motor means to set the screw in rotation about its own longitudinal axis;
   a primary body connected to a control surface and engaged on the lead screw by means of a plurality of balls movable on the thread of said screw;
   a secondary body connected to the primary body and having an auxiliary portion provided with an engagement surface facing the thread of the control screw at a predetermined distance; the engagement surface being shaped to engage the thread of said lead screw;
   wherein it further comprises means for de-coupling the secondary body from the auxiliary portion in the rotation motion about the longitudinal axis radially interposed between said secondary body and said auxiliary portion; with the secondary body de-coupled from the auxiliary portion, said auxiliary portion being free to rotate together with the screw with respect to the secondary body upon any rotation of the screw.

2. An actuator as claimed in claim 1, wherein the means for de-coupling the secondary body from the auxiliary portion comprising at least a weakened portion for connecting the secondary body and said auxiliary portion.

3. An actuator as claimed in claim 2, wherein the means to de-couple the secondary body from the auxiliary portion comprise friction reducing means radially interposed between said secondary body and said auxiliary portion.

4. An actuator as claimed in claim 1, wherein the auxiliary portion has a tubular shape coaxial to the lead screw.

5. An actuator as claimed in claim 4, wherein the engagement surface of the auxiliary portion with tubular shape internally has an inverse thread adapted to engage the thread of the lead screw.

6. An actuator as claimed in claim 2, wherein the weakened connecting portion is a pin inserted in the auxiliary portion and in the secondary body.

7. An actuator as claimed in claim 3, wherein the friction reducing means have at least a bearing.

8. An actuator as claimed in claim 3, wherein the secondary body coaxially surrounds the auxiliary portion.

9. An actuator as claimed in claim 8, wherein the friction reducing means have at least a bearing interposed between the secondary body and the auxiliary portion.

10. An actuator as claimed in claim 8, wherein the friction reducing means have two bearings set side by side and interposed between the secondary body and the auxiliary portion.

11. An actuator as claimed in claim 8, wherein the weakened connecting portion is a pin inserted in the secondary body and in the auxiliary portion.

12. An actuator as claimed in claim 8, wherein the secondary body has:
a first tubular body radially distanced from the auxiliary portion, to define a containment chamber for at least a bearing defining said friction reducing means;
a second tubular body coaxial and integral with the first and radially approached to the auxiliary portion.

13. An actuator as claimed in claim 12, wherein the weakened connecting portion is a pin inserted into the second tubular body of the secondary body and into the auxiliary portion.

14. An actuator as claimed in claim 1, wherein at least the engagement surface of said auxiliary portion is made of material with high friction coefficient.

15. An actuator as claimed in claim 1 wherein at least the engagement surface of said auxiliary portion is made of low friction material.

16. An actuator as claimed in claim 1, wherein the primary body is directly connected to the secondary body.

17. An actuator as claimed in claim 16, wherein the secondary body is connected to the primary body about an axis orthogonal to the longitudinal axis of the lead screw.

18. An actuator as claimed in claim 1, wherein the primary body forms a single body with the secondary body.

19. An actuator as claimed in claim 1, wherein the secondary body is directly connected to the control surface.

20. Ball screw actuator for aircraft control surfaces, comprising:
a lead screw having a thread;
motor means to set the screw in rotation about its own longitudinal axis;
a primary body connected to a control surface and engaged on the lead screw by means of a plurality of balls movable on the thread of said screw;
a secondary body connected to the primary body and having an auxiliary portion provided with an engagement surface facing the thread of the control screw at a predetermined distance; the engagement surface being shaped to engage the thread of said lead screw; the secondary body being engageable to the screw only through the engagement surface of said auxiliary portion;
wherein it further comprises means for de-coupling the secondary body from the auxiliary portion in the rotation motion about the longitudinal axis radially interposed between said secondary body and said auxiliary portion;
with the secondary body de-coupled from the auxiliary portion, said auxiliary portion being free to rotate together with the screw with respect to the secondary body upon any rotation of the screw.

21. Ball screw actuator for aircraft control surfaces, comprising:
a lead screw having a thread;
motor means to set the screw in rotation about its own longitudinal axis;
a primary body connected to a control surface and engaged on the lead screw by means of a plurality of balls movable on the thread of said screw;
a secondary body connected to the primary body and having an auxiliary portion provided with an engagement surface facing the thread of the control screw at a predetermined distance; the engagement surface being shaped to engage the thread of said lead screw; the auxiliary portion being integral with the secondary body along the longitudinal axis; the secondary body being engageable to the screw only through the engagement surface of said auxiliary portion;
wherein it further comprises means for de-coupling the secondary body from the auxiliary portion in the rotation motion about the longitudinal axis radially interposed between said secondary body and said auxiliary portion; with the secondary body de-coupled from the auxiliary portion, said auxiliary portion being free to rotate together with the screw with respect to the secondary body upon any rotation of the screw, preventing any axial motion of said secondary body.

* * * * *